US012673607B2

(12) United States Patent
Biecker

(10) Patent No.: US 12,673,607 B2
(45) Date of Patent: Jul. 7, 2026

(54) GLASS ROOF ASSEMBLY FOR A MOTOR VEHICLE

(71) Applicant: Bayerische Motoren Werke Aktiengesellschaft, Munich (DE)

(72) Inventor: Peter Biecker, Deisenhofen bei Muenchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 280 days.

(21) Appl. No.: 18/709,079

(22) PCT Filed: Jan. 19, 2023

(86) PCT No.: PCT/EP2023/051226
§ 371 (c)(1),
(2) Date: May 10, 2024

(87) PCT Pub. No.: WO2023/151917
PCT Pub. Date: Aug. 17, 2023

(65) Prior Publication Data
US 2026/0158994 A1    Jun. 11, 2026

(30) Foreign Application Priority Data

Feb. 10, 2022    (DE) ..................... 10 2022 103 129.2

(51) Int. Cl.
*B60Q 1/00*        (2006.01)
*B60Q 3/208*       (2017.01)
*B60Q 3/64*        (2017.01)
(52) U.S. Cl.
CPC .............. *B60Q 3/208* (2017.02); *B60Q 3/64* (2017.02)

(58) Field of Classification Search
CPC .................................. B60Q 3/64; B60Q 3/208
See application file for complete search history.

(56) References Cited

U.S. PATENT DOCUMENTS

| | | | |
|---|---|---|---|
| 10,139,080 B2 * | 11/2018 | Masaki ................. | B60Q 3/745 |
| 2011/0273874 A1 * | 11/2011 | Verrat-Debailleul ....................... | |
| | | | B32B 17/10541 |
| | | | 362/231 |

(Continued)

FOREIGN PATENT DOCUMENTS

| | | |
|---|---|---|
| DE | 10 2012 109 900 A1 | 4/2014 |
| DE | 10 2015 219 586 A1 | 4/2017 |

(Continued)

OTHER PUBLICATIONS

International Search Report (PCT/ISA/210) issued in PCT Application No. PCT/EP2023/051226 dated Apr. 20, 2023 with English translation (5 pages).

(Continued)

*Primary Examiner* — Gerald J Sufleta, II
(74) *Attorney, Agent, or Firm* — Crowell & Moring LLP

(57)        ABSTRACT

A glass roof assembly for a motor vehicle includes roof glazing, a roofliner, a light-source receptacle, a latching element and a latching counter-element. The light-source receptacle is fixed to the roof glazing. The latching element is formed on the roofliner. The latching counter-element is formed on the light-source receptacle and is in engagement with the latching element. The light-source receptacle has a cutout in which a light source can be arranged.

9 Claims, 2 Drawing Sheets

(56)                    References Cited

U.S. PATENT DOCUMENTS

2015/0298601 A1    10/2015  Bott et al.
2016/0129945 A1*    5/2016  Deppe ...................... B60Q 3/62
                                               296/211
2020/0122637 A1     4/2020  Thannheimer
2024/0010059 A1*    1/2024  Knöpfle ................ B60J 7/1642

FOREIGN PATENT DOCUMENTS

DE      10 2019 212 088  A1     2/2021
WO      WO 2018/219657  A1     12/2018

OTHER PUBLICATIONS

German-language Written Opinion (PCT/ISA/237) issued in PCT Application No. PCT/EP2023/051226 dated Apr. 20, 2023 with English translation (8 pages).
German-language Search Report issued in German Application No. 10 2022 103 129.2 dated Jul. 29, 2022 with partial English translation (12 pages).

* cited by examiner

GLASS ROOF ASSEMBLY FOR A MOTOR VEHICLE

BACKGROUND AND SUMMARY

The present invention relates to a glass roof arrangement for a motor vehicle.

Glass roof arrangements for motor vehicles are known from the prior art in a variety of configurations.

DE 10 2019 212 088 A1 describes a glass roof arrangement having a glass element, a guide rail arrangement and a roof lining. The guide rail arrangement is fixed to the glass element. In order to fasten the roof lining, the glass roof arrangement has a fastening element. The fastening element is firmly connected to the roof lining and can be fastened to the guide rail arrangement.

The glass roof arrangement known from DE 10 2019 212 088 A1 cannot, however, be equipped with a light source.

On the basis of the glass roof arrangement described in DE 10 2019 212 088 A1, it is an object of the present invention to provide a glass roof arrangement for a motor vehicle, which can be used with and without a light source and may therefore be used in a modular fashion.

This object is achieved according to the invention by the glass roof arrangement for a motor vehicle having the features of the independent claim(s).

The invention thus provides a glass roof arrangement for a motor vehicle, which comprises a roof glazing, a (motor vehicle) roof lining, a light source holder, a latch element and a mating latch element. The latch element is formed on the roof lining, i.e. it is either a component of the roof lining or is firmly fixed to the roof lining. The mating latch element is formed on the light source holder, i.e. it is either a component of the light source holder or is firmly fixed to the light source holder. The latch element is engaged with the mating latch element in order to fix the roof lining to the light source holder, and therefore to the roof glazing. The light source holder comprises a recess in which a light source can be arranged.

A central concept of the invention is thus for the light source holder, by means of which the roof lining is fixed to the roof glazing, to be provided with a recess for a light source.

The glass roof arrangement according to the invention may therefore be used with and without a light source, and may consequently be used in a modular fashion for various requirements.

The term "roof lining" in the context of the present invention describes a cladding of an inner side of a roof region of the motor vehicle.

The roof glazing can for example be fixed, in particular adhesively bonded, to the body of the motor vehicle.

The light source holder may be fixed to the lower side of the roof glazing, which faces toward an interior of the motor vehicle.

In one preferred embodiment of the glass roof arrangement according to the invention, the light source holder is fixed to the lower side of the roof glazing of the motor vehicle in a first attachment region, in particular by means of an adhesive bond.

The recess is, for example, bounded upward in the height direction of the glass roof arrangement by the roof glazing.

The latch element may be a latching tab, and the mating latch element may be an indentation.

In one preferred embodiment, the glass roof arrangement according to the invention comprises a light source, which is arranged in the recess of the light source holder.

In one exemplary embodiment, the glass roof arrangement according to the invention comprises a light shield for shielding light, in particular stray light of the light source.

If the light source is arranged in the recess of the light source holder, the glass roof arrangement comprises for example a light-guiding glass pane with light extraction means.

The light-guiding glass pane may, together with the light shield, close a cavity between the light source holder and the roof glazing, which cavity connects the recess to an interior of the motor vehicle.

Light guided by the light-guiding glass pane can emerge from the light-guiding glass pane into the interior via the light extraction means.

The light-guiding glass pane is, for example, fixed to a side of the roof glazing that faces toward the interior of the motor vehicle.

The light shield may be arranged between the light-guiding glass pane and the light source holder.

The light shield is, for example, opaque.

For example, the light source holder is fixed to the light-guiding glass pane, and therefore to the roof glazing, by means of the stray light seal in a second attachment region.

For example, the first attachment region is different to the second attachment region.

The first attachment region may be arranged further outward than the second attachment region, particularly in the transverse direction of the glass roof arrangement and/or in the longitudinal direction of the glass roof arrangement.

The light shield, the light source holder and/or the adhesive bond, by means of which the light source holder is fixed to the roof glazing in the first attachment region, trap or traps for example light, in particular stray light of the light source, in such a way that light of the light source reaches an interior of the motor vehicle and/or the rear side of the roof lining, which faces away from the interior of the motor vehicle, only via the light-guiding glass pane.

The light source holder and/or the adhesive bond may thus likewise (each) be used as a light shield, i.e. they or it may be opaque.

The light shield, the light source holder and/or the adhesive bond thus for example impede light, in particular stray light of the light source, from reaching the interior of the motor vehicle and/or the rear side of the roof lining other than via the light-guiding glass pane.

In one exemplary embodiment of the glass roof arrangement according to the invention, the light source is fixed in the light source holder. In particular, the light source is adhesively bonded to the light source holder.

If the recess of the light source holder is free from a light source, i.e. a light source is not arranged in the recess, the glass roof arrangement comprises for example a spacer element.

For example, the light shield and the spacer element connect the light source holder to the roof glazing in the second attachment region. The light shield and the spacer element thus, for example, close a cavity between the light source holder and the roof glazing, by means of which cavity the recess is connected to an interior of the motor vehicle.

The light shield may bear in particular with its lower side on the light source holder, and in particular with its upper side on the spacer element.

The spacer element, for example, bears in particular with its lower side on the light shield, and in particular with its upper side on the roof glazing.

The cavity between the light source holder and the roof glazing, by means of which the recess is connected to the interior of the motor vehicle, may thus be closed either by means of the light shield and the light-guiding glass pane or by means of the light shield and the spacer element.

In particular, the light source holder and the roof glazing are connected in the second attachment region, that is to say by means of the light shield and the light-guiding glass pane, or close the cavity between the latter, when a light source is arranged in the light source holder.

If a light source is not arranged in the light source holder, the light source holder and the roof glazing are connected to one another in the second attachment region, in particular by means of the light shield and the spacer element.

The glass roof arrangement may therefore be used both with and without a light source.

In one exemplary embodiment, the glass roof arrangement according to the invention comprises a foam surround which circumferentially encloses the roof glazing at least partially.

The spacer element is a component of the light shield.

The spacer element may be produced from the same material and/or by the same method as the foam surround.

The spacer element may be an injection-molded plastic part, which is adhesively bonded to the roof glazing.

In one preferred embodiment of the glass roof arrangement according to the invention, the light source holder, in particular the recess, extends in the longitudinal direction of the glass roof arrangement.

In one exemplary embodiment of the glass roof arrangement according to the invention, the light source holder, in particular the recess, extends in the transverse direction of the glass roof arrangement.

The light source holder, in particular the recess, may extend over approximately the entire length or width of the roof glazing or over subregions of the roof glazing.

The light source holder is, for example, arranged in an edge region of the roof glazing.

The light source holder may extend continuously, in particular over the entire edge region of the roof glazing.

The light source holder may thus comprise two regions that extend in the longitudinal direction of the glass roof arrangement and two regions that extend in the transverse direction of the glass roof arrangement.

The regions that extend in the longitudinal direction of the glass roof arrangement may be connected at the end respectively to ends of the regions that extend in the transverse direction of the glass roof arrangement. The light source holder may thus form a type of frame, which bears on the lower side of the roof glazing.

The invention is explained in more detail below with the aid of exemplary embodiments that are represented in the drawings.

DETAILED DESCRIPTION OF THE DRAWINGS

Figure 1:
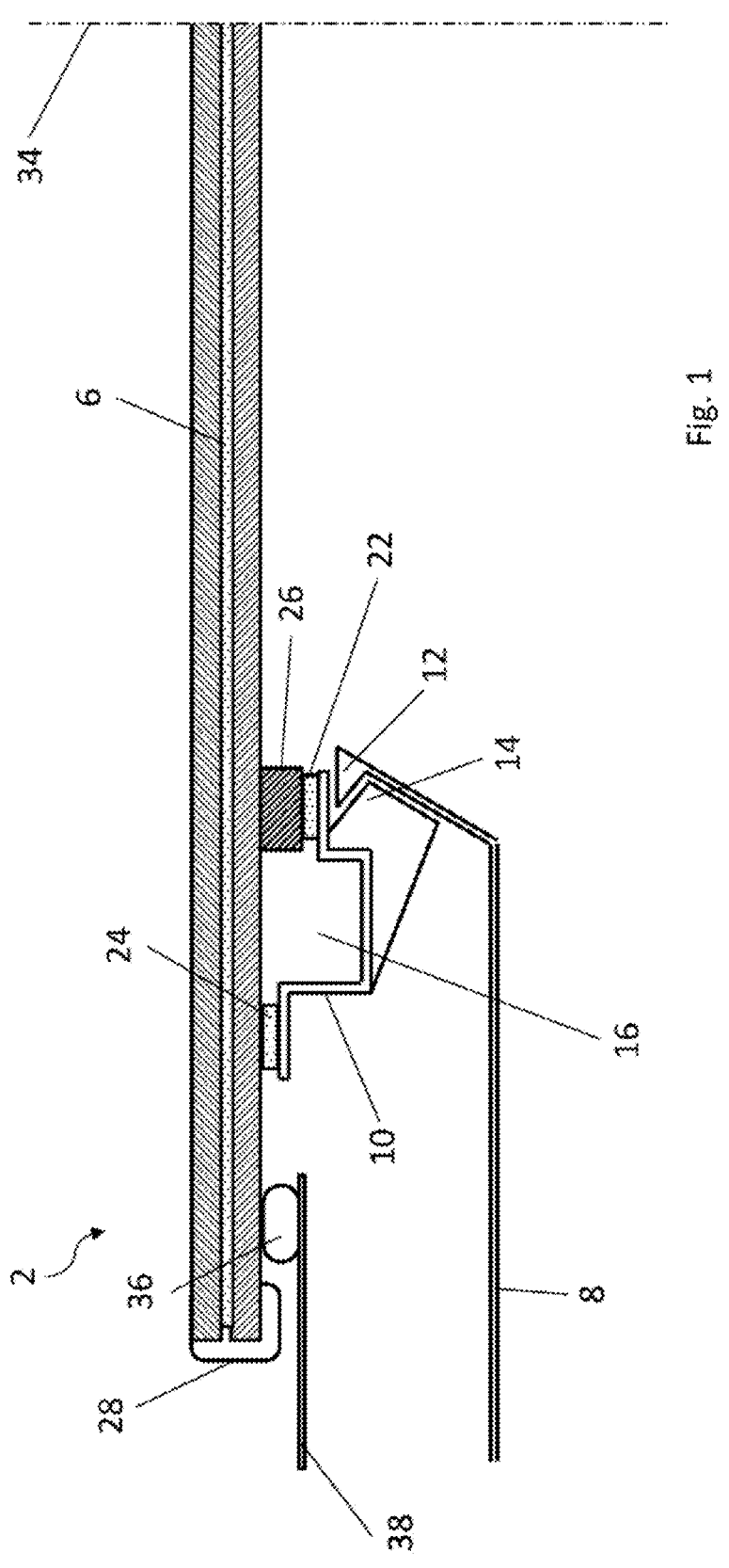
FIG. 1 is a sectional view of a first glass roof arrangement according to an embodiment of the invention.

FIG. 1 represents a sectional view of a section of a first glass roof arrangement 2 in the transverse direction of the glass roof arrangement.

Since the first glass roof arrangement 2 is configured mirror-symmetrically with respect to a longitudinal midplane 34 of the glass roof arrangement, only a left side of the first glass roof arrangement 2 is represented in FIG. 1. A representation of the right side of the first glass roof arrangement 2 has been omitted. Correspondingly, the following comments are also restricted to the left side of the first glass roof arrangement 2. The comments apply correspondingly for the right side of the first glass roof arrangement 2.

The first glass roof arrangement 2 comprises a roof glazing 6, a roof lining 8 and a light source holder 10 with a recess 16. The recess 16 extends in the longitudinal direction of the glass roof arrangement and has a rectangular profile. If required, a light source 18 may be arranged in the recess 16.

The roof glazing 6 is firmly fixed to a body 38 of the motor vehicle by means of an adhesive bond 36. The adhesive bond 36 is arranged on the lower side of the roof glazing 6 and extends circumferentially.

A foam surround 28 is provided on the outer circumferential surface of the roof glazing 6. The foam surround 28 extends over the entire outer circumferential surface of the roof glazing 6.

The light source holder 10 is fixed to the roof glazing 6 in a first attachment region by means of a further adhesive bond 24.

In a second attachment region, which is arranged further inward, i.e. in the present case closer to the longitudinal midplane 34 of the glass roof arrangement than the first attachment region, the light source holder 10 is fixed to the roof glazing 6 by means of a light shield 22 and a spacer element 26.

The light shield 22 bears with the lower side on the light source holder 10 and with the upper side on the spacer element 26. The spacer element 26 in turn bears with the lower side on the light shield 22 and with the upper side on the roof glazing 6. The light shield 22 and the spacer element 26 therefore enclose a cavity between the roof glazing 6 and the light source holder 10, which cavity connects the recess 16 to an interior of the motor vehicle.

In order to fix the roof lining 8 to the light source holder 10, the roof lining 8 comprises a latch element 12 and the light source holder 10 comprises a mating latch element 14. The latch element 12 and the mating latch element 14 are engaged in such a way that the roof lining 8 is secured to the light source holder 10.

Figure 2:
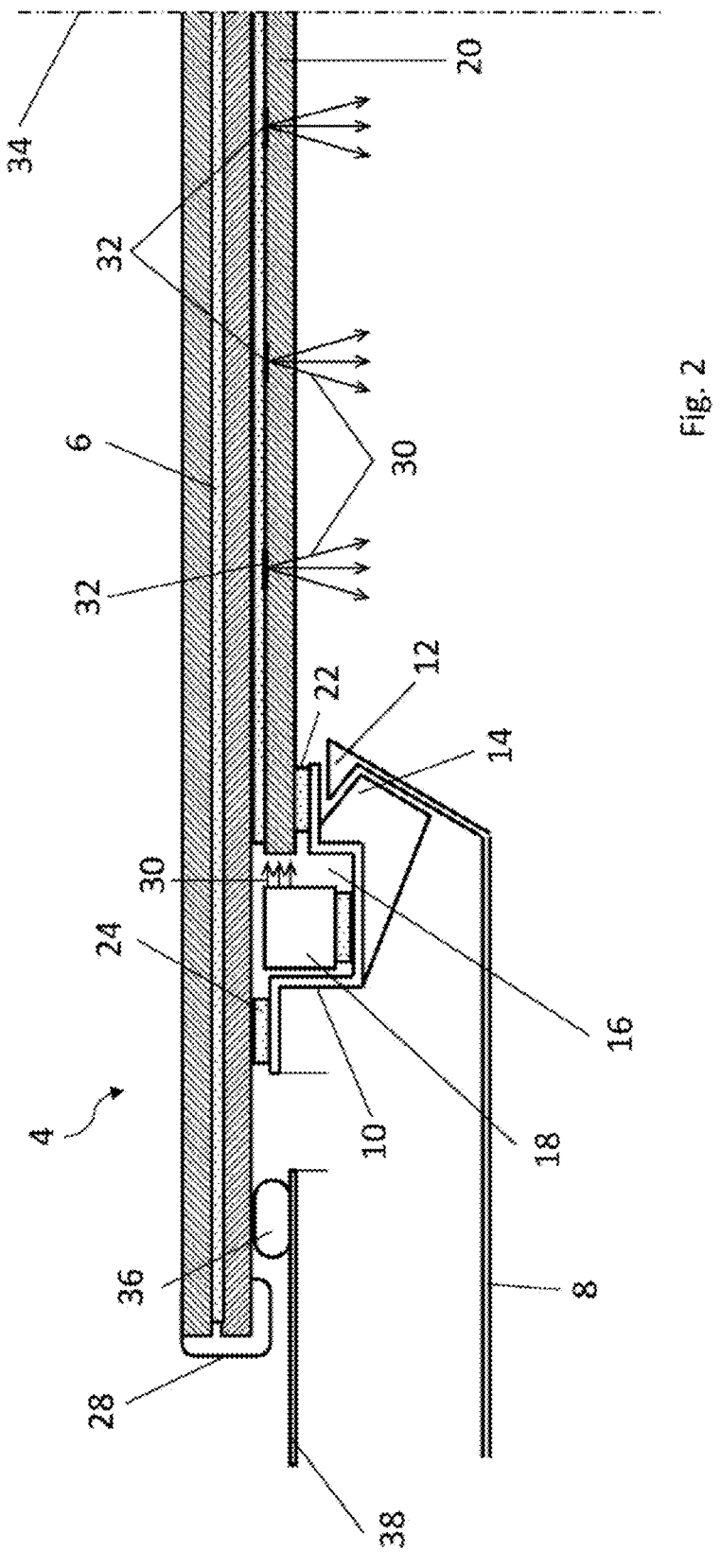
FIG. 2 is a sectional view of a second glass roof arrangement according to an embodiment of the invention.

FIG. 2 represents a view, corresponding to FIG. 1, of a second glass roof arrangement 4 according to the invention. The second glass roof arrangement 4 corresponds substantially to the first glass roof arrangement 2 represented in FIG. 1. For this reason, only the differentiating features are explained below. For all other features, the comments above relating to the first glass roof arrangement 2 represented in FIG. 1 correspondingly apply.

Instead of the spacer element 26, the second glass roof arrangement 4 comprises a light-guiding glass pane 20 with a light extraction element element 32. Unlike in the case of the first glass roof arrangement 2, the light-guiding glass pane 20 instead of the spacer element 26 is thus arranged between the light shield 22 and the roof glazing 6.

A light source 18, which in the actuated state emits light rays 30, is provided in the recess 16 of the light source holder 10. The light rays 30 of the light source 18 are guided by the light-guiding glass pane 20. The light extraction element 32 allow the light rays 30 to emerge from the light-guiding glass pane 20 into the interior of the motor vehicle.

The light source holder 10, the light shield 22 and the adhesive bond 24 are configured to be opaque so that no light rays 30 of the light source 18 can pass through them. The light source holder 10, the light shield 22 and the adhesive bond 24 therefore ensure that light rays 30 of the light source 18 can reach the interior of the motor vehicle only via the light-guiding glass pane 20, in particular the light extraction element 32.

LIST OF REFERENCE SIGNS

2 first glass roof arrangement
4 second glass roof arrangement
6 roof glazing
8 roof lining
10 light source holder
12 latch element
14 mating latch element
16 recess
18 light source
20 light-guiding glass pane
22 light shield
24 adhesive bond
26 spacer element
28 foam surround
30 light ray
32 light extraction element
34 longitudinal midplane of glass roof arrangement
36 adhesive bond
38 body

What is claimed is:

1. A glass roof arrangement for a motor vehicle, comprising:
   a roof glazing;
   a roof lining;
   a light source holder;
   a latch element; and
   a mating latch element, wherein
   the light source holder is fixed to the roof glazing,
   the latch element is formed on the roof lining,
   the mating latch element is formed on the light source holder,
   the latch element is engaged with the mating latch element, and
   the light source holder comprises a recess in which a light source is arrangeable.

2. The glass roof arrangement according to claim 1, wherein
   the recess is bounded upward in a height direction of the glass roof arrangement by the roof glazing.

3. The glass roof arrangement according to claim 1, wherein
   the light source holder is fixed to the roof glazing in a first attachment region by an adhesive bond.

4. The glass roof arrangement according to claim 3, further comprising:
   the light source, which is arranged in the recess of the light source holder;
   a light-guiding glass pane and a light shield,
   wherein the light source holder, the light shield and/or the adhesive bond trap light of the light source such that light of the light source reaches an interior of the motor vehicle and/or a rear side of the roof lining only via the light-guiding glass pane.

5. The glass roof arrangement according to claim 3, further comprising:
   a light shield and a spacer element, which connect the light source holder to the roof glazing in a second attachment region when the light source holder is free from the light source.

6. The glass roof arrangement according to claim 5, wherein
   the spacer element is a component of the light shield,
   the spacer element is an injection-molded plastic part, which is adhesively bonded to the roof glazing, or
   the glass roof arrangement comprises a foam surround which circumferentially encloses the roof glazing, and the spacer element is produced from a same material and by a same method as the foam surround.

7. The glass roof arrangement according to claim 1, wherein
   the light source holder extends in a longitudinal direction of the glass roof arrangement and/or in a transverse direction of the glass roof arrangement.

8. The glass roof arrangement according to claim 1, wherein the recess has a rectangular profile.

9. The glass roof arrangement according to claim 1, wherein the roof glazing is fixed to a body of the motor vehicle.

\* \* \* \* \*